United States Patent
Chan et al.

(10) Patent No.: US 7,829,200 B2
(45) Date of Patent: Nov. 9, 2010

(54) MAGNESIUM-BASED COMPOSITE MATERIAL AND METHOD FOR MAKING THE SAME

(75) Inventors: Kam-Shau Chan, Taipei Hsien (TW); Cheng-Shi Chen, Taipei Hsien (TW); Guang-Liang Sheu, Taipei Hsien (TW); Jie Wang, Tai-yuan (CN); Wen-Zhen Li, Beijing (CN); Kai-Li Jiang, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 293 days.

(21) Appl. No.: 12/109,226

(22) Filed: Apr. 24, 2008

(65) Prior Publication Data

US 2009/0061211 A1 Mar. 5, 2009

(30) Foreign Application Priority Data

Aug. 31, 2007 (CN) .................. 2007 1 0076758

(51) Int. Cl.
*B32B 15/14* (2006.01)
*B32B 15/16* (2006.01)
*C22C 101/10* (2006.01)
*C22C 1/10* (2006.01)
*B22D 19/00* (2006.01)

(52) U.S. Cl. .................. 428/649; 428/632; 428/634; 428/109; 428/143; 164/97; 156/276; 427/367; 427/369; 427/370; 228/176

(58) Field of Classification Search ................. None
See application file for complete search history.

(56) References Cited

U.S. PATENT DOCUMENTS

| | | | | |
|---|---|---|---|---|
| 3,888,661 A * | 6/1975 | Levitt et al. | ................ | 419/6 |
| 4,223,075 A * | 9/1980 | Harrigan et al. | ............ | 428/610 |
| 4,731,298 A * | 3/1988 | Shindo et al. | ............... | 428/611 |
| 5,993,565 A * | 11/1999 | Pinkerton et al. | .......... | 148/104 |
| 2004/0053780 A1* | 3/2004 | Jiang et al. | ................. | 502/182 |
| 2007/0036978 A1* | 2/2007 | Chen | ........................ | 428/408 |
| 2008/0127777 A1* | 6/2008 | Motegi et al. | ................ | 75/342 |
| 2009/0081408 A1* | 3/2009 | Chan et al. | ................. | 428/109 |

FOREIGN PATENT DOCUMENTS

| | | | | |
|---|---|---|---|---|
| JP | 57169347 A | * | 10/1982 | |
| JP | 58107435 A | * | 6/1983 | |
| JP | 2007016286 A | * | 1/2007 | |
| JP | 2007291432 A | * | 11/2007 | |

* cited by examiner

*Primary Examiner*—Aaron Austin
(74) *Attorney, Agent, or Firm*—Andrew C. Cheng

(57) ABSTRACT

The present invention relates to a magnesium-based composite material includes at least two magnesium-based metallic layers; and at least one magnesium-based composite layer respectively sandwiched by the at least two magnesium-based metallic layers. The present invention also relates to a method for fabricating a magnesium-based composite material, the method includes the steps of: (a) providing at least two magnesium-based plates; (b) providing a plurality of nanoscale reinforcements; (c) sandwiching the nanoscale reinforcements between the at least two magnesium-based plates to form a preform; and (d) hot pressing the preform to achieve the magnesium-based composite material.

18 Claims, 5 Drawing Sheets

MAGNESIUM-BASED COMPOSITE MATERIAL AND METHOD FOR MAKING THE SAME

RELATED APPLICATIONS

This application is related to commonly-assigned application entitled, "MAGNESIUM-BASED COMPOSITE MATERIAL AND METHOD FOR MAKING THE SAME", Ser. No. 12/109,220 filed 2008 Apr. 24. Disclosure of the above-identified application is incorporated herein by reference.

BACKGROUND

1. Field of the Invention

The present invention relates to composite materials and methods for fabricating the same and, particularly, to a magnesium-based composite material and a method for fabricating the same.

2. Discussion of Related Art

Nowadays, various alloys have been developed for special applications. Among these alloys, magnesium alloys have relatively superior mechanical properties, such as low density, good wear resistance, and high elastic modulus. Generally, two kinds of magnesium alloys have been developed: casting magnesium alloy and wrought magnesium alloy. In wrought magnesium alloy, by using an extrusion process, most of the casting defects can be eliminated and the metal grains can be refined. However, the toughness and the strength of the magnesium alloys are not able to meet the increasing needs of the automotive and aerospace industry for tougher and stronger alloys.

To address the above-described problems, magnesium-based composite materials have been developed. In the magnesium-based composite material, nanoscale reinforcements are mixed with the magnesium metal or alloy. The most common methods for making the magnesium-based composite material are through powder metallurgy and stir casting. However, in powder metallurgy, the metal or alloy is easily oxidized because the metal or alloy is in the form of a fine powder. In particular, the magnesium powder may spontaneously combust due to oxidization. In stir casting, the nanoscale reinforcements are added to melted metal or alloy and are prone to aggregate. As such, the nanoscale reinforcements can't be well dispersed. Further, the above-mentioned methods generally include complex processes using high cost manufacturing equipment.

What is needed, therefore, is to provide a magnesium-based composite material and a method for fabricating the same, in which the above problems are eliminated or at least alleviated.

SUMMARY

In one embodiment, a magnesium-based composite material includes at least two magnesium-based metallic layers; and at least one magnesium-based composite layer sandwiched by the at least two magnesium-based metallic layers.

In another embodiment, a method for fabricating the above-mentioned magnesium-based composite material, the method includes the steps of: (a) providing at least two magnesium-based plates; (b) providing a plurality of nanoscale reinforcements; (c) sandwiching the nanoscale reinforcements between the at least two magnesium-based plates to form a preform; and (d) hot pressing the preform to achieve the magnesium-based composite material.

Other advantages and novel features of the present magnesium-based composite material and the related method for fabricating the same will become more apparent from the following detailed description of preferred embodiments when taken in conjunction with the accompanying drawings.

BRIEF DESCRIPTION OF THE DRAWINGS

Many aspects of the present magnesium-based composite material and the related method for fabricating the same can be better understood with reference to the following drawings. The components in the drawings are not necessarily to scale, the emphasis instead being placed upon clearly illustrating the principles of the present magnesium-based composite material and the related method for fabricating the same.

Figure 1:
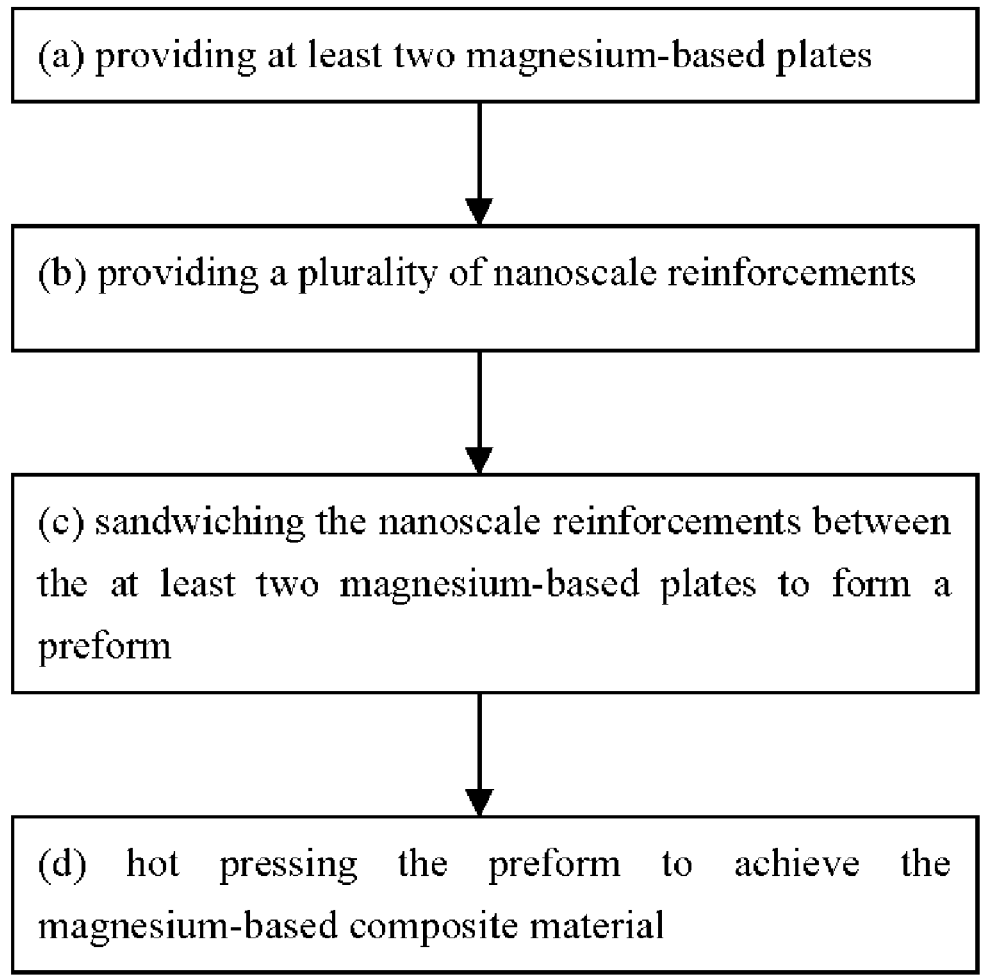
FIG. 1 is a flow chart of a method for fabricating a magnesium-based composite material, in accordance with a present embodiment.

Corresponding reference characters indicate corresponding parts throughout the several views. The exemplifications set out herein illustrate at least one preferred embodiment of the present magnesium-based composite material and the related method for fabricating the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present magnesium-based composite material and the related method for fabricating the same.

Referring to FIG. 1, a method for fabricating a magnesium-based composite material includes the steps of: (a) providing at least two magnesium-based plates; (b) providing a plurality of nanoscale reinforcements; (c) sandwiching the nanoscale reinforcements between the at least two magnesium-based plates to form a preform; and (d) hot pressing the preform to achieve the magnesium-based composite material.

In step (a), the material of the magnesium-based plates can, beneficially, be pure magnesium or magnesium-based alloys. The components of the magnesium-based alloys include magnesium and other elements selected from a group consisting of zinc (Zn), manganese (Mn), aluminum (Al), thorium (Th), lithium (Li), silver, calcium (Ca), and any combination thereof. A weight ratio of the magnesium to the other elements can advantageously, be more than about 4:1. The components of the at least two magnesium-based plates can be the same or different. A thickness of the magnesium-based plates can, beneficially, be in the approximate range from 0.1 millimeter to 1 millimeter. Quite suitably, the thickness of the magnesium-based plates is about 0.3 millimeter.

In step (b), the material of the nanoscale reinforcements can, suitably, be selected from a group consisting of carbon nanotubes, carbon nanofibers, silicon carbide nano-particles, alumina ($Al_2O_3$) nano-particles, titanium carbide (TiC) nano-particles, and any combination thereof. The diameter of the nanoscale reinforcements can, beneficially, be in the approximate range from 1 nanometer to 100 nanometers. In the present embodiment, the diameter of the nanoscale reinforcements is about 10 nanometers to 50 nanometers. The mass percentage of the nanoscale reinforcements in the magnesium-based composite material is in the approximate range from 0.5% to 2%. Quite usefully, the weight percentage of the nanoscale reinforcement is 1%. It is to be understood that the nanoscale reinforcements are not restricted to the above-mentioned materials but any nanoscale particles having reinforcement ability.

In the present embodiment, the nanoscale reinforcements is the carbon nanotubes, and can, beneficially, be provided by a conventional chemical vapor deposition (CVD) method.

In step (c), in the present embodiment, the nanoscale reinforcements can, beneficially, be sandwiched by the at least two magnesium-based plates by uniformly disposing the nanoscale reinforcements between the two magnesium-based plates by the substeps of: (c1) forming a binder film on a surface of one of the magnesium-based plates; (c2) uniformly sprinkling the nanoscale reinforcements on the binder film; and (c3) covering the nanoscale reinforcements by the other one of magnesium-based plates to achieve the preform.

In step (c1), the material of the binder film is adhesive at room temperature and volatilizable at high temperature. In the present embodiment, the binder can, advantageously, be a pressure sensitive adhesive.

It is to be understood that the nanoscale reinforcements can be uniformly disposed between the two magnesium-based plates by any known method in the art. In another embodiment, the nanoscale reinforcements can be dispersed in a solvent and sprayed on the surface of one magnesium-based plate and covered by the other magnesium-based plate. The solvent is volatilizable at high temperature.

Figure 2:
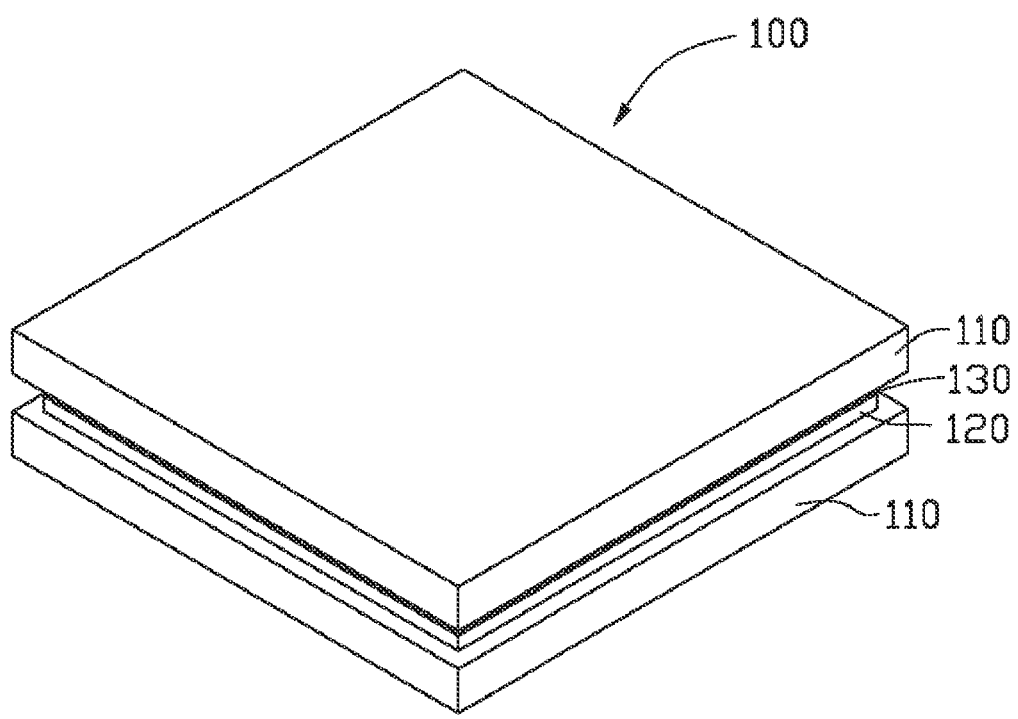
FIG. 2 is a schematic view of a preform of the magnesium-based composite material of FIG. 1.

Referring to FIG. 2, a preform 100 formed in step (c), in the present embodiment, includes two magnesium-based plates 110, a binder film 120, and a plurality of nanoscale reinforcements 130. The binder film 120 is formed on one magnesium-based plates 110. The nanoscale reinforcements 130 are uniformly sprinkled on the binder film 120 and sandwiched by the two magnesium-based plates 110. It will be apparent to those having ordinary skill in the field of the present invention that the number of the magnesium-based plates is arbitrary or depended on actual needs/use. The nanoscale reinforcements are respectively sandwiched by the magnesium-based plates.

Figure 3:
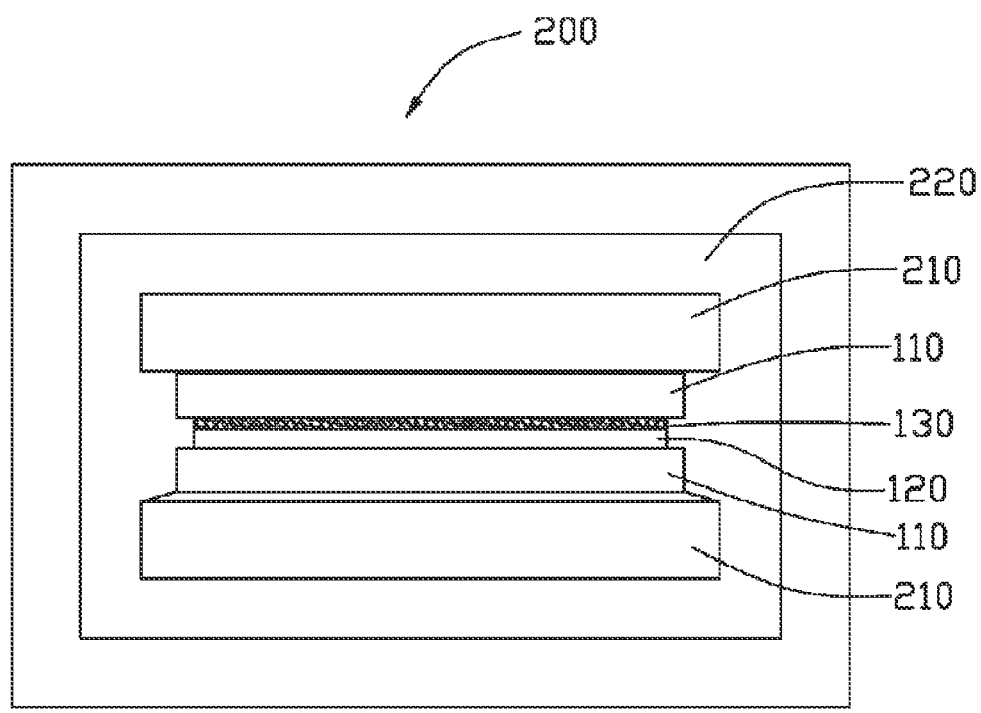
FIG. 3 is a schematic view of a hot-pressing step of the method of FIG. 1.

Referring to FIG. 3, a hot-pressing machine 200 includes a container 220, and two boards 210 disposed in the container 220. The boards 210 can, beneficially, be heated to a predetermined temperature. A vacuum pump (not shown in FIG. 2) can, usefully, be connected to the container 220 to evacuate the air therein. A protective gas can, suitably, be filled into the container 230 through a pipe (not shown in FIG. 2) connected thereto. The protective gas can, opportunely, be nitrogen ($N_2$) and/or a noble gas.

In step (d), the preform 100 can, advantageously, be hot pressed by the hot-pressing machine 200 by the substeps of: (d1) disposing the preform 100 between the two boards 210; (d2) evacuating the air in the container 220 and filling a protective gas into the container 220; (d3) applying a pressure on the preform 100 through the two boards 210 at an elevated temperature for a period of time (e.g. about 5 to 15 hours); and (d4) relieving the pressure on the preform 100 and cooling the preform 100 to room temperature to achieve the magnesium-based composite material. Through hot pressing, the magnesium-based material infiltrates into the interspaces between the nanoscale reinforcements and forms a composite material. The pressure can, suitably, be in the approximate range from 50 to 100 Mega Pascal (MPa). The temperature can, opportunely, be in the approximate range from 300° C. to 400° C.

Quite suitably, an additional step (e) of annealing the magnesium-based composite material can, advantageously, be further provided after step (d). In step (e), the magnesium-based composite material can be annealed in vacuum or in a protective gas. The protective gas can, beneficially, be nitrogen ($N_2$) and/or a noble gas. The annealing temperature is in the approximate range from 180° C. to 320° C. The annealing time is about 2 to 3 hours. The annealing step can eliminate defects in the magnesium-based composite material caused by stress in step (d).

It is to be understood that, in the present method, the nanoscale reinforcements are easier to be uniformly distributed in the composite material than in the conventional methods (e.g. a stir casting method). As such, the method can be easily used in mass production.

Figure 4:
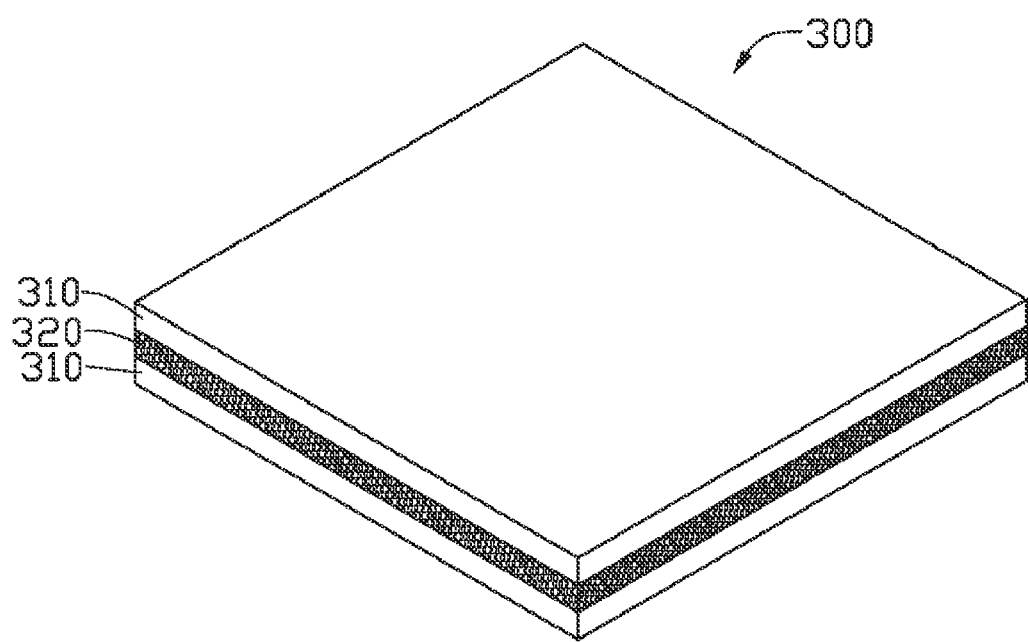
FIG. 4 is a schematic view of a magnesium-based composite material, in accordance with a first embodiment.

Referring to FIG. 4, the magnesium-based composite material 300 in the first embodiment includes two magnesium-based metallic layers 310, and one magnesium-based composite layer 320. The magnesium-based composite layer 320 is sandwiched by the two magnesium-based metallic layers 310 with a plurality of nanoscale reinforcements uniformly dispersed therein. The thickness of the magnesium-based metallic layer 310 is in the approximate range from 0.2 to 0.4 millimeter. The thickness of the magnesium-based composite layer 320 is in the approximate range from 1 nanometer to 100 nanometers. In the magnesium-based composite layer 320, magnesium-based metallic material is filled in the interspaces between the nanoscale reinforcements, and thereby, forms a composite layer. The nanoscale reinforcements uniformly dispersed in the magnesium-based composite material. Therefore, the toughness and the strength of the magnesium-based composite material can be enhanced.

Figure 5:
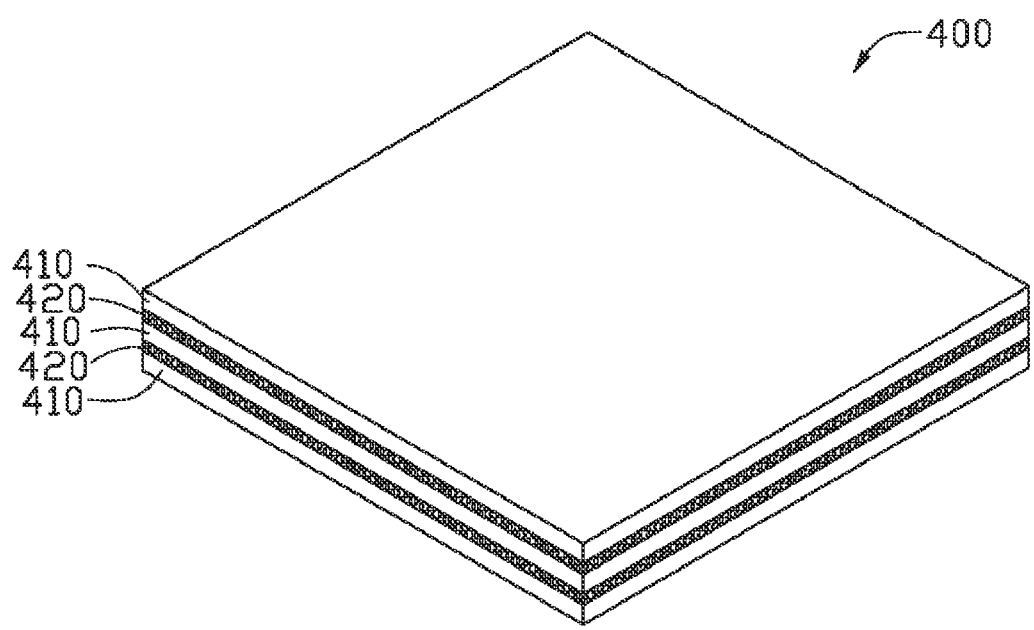
FIG. 5 is a schematic view of a magnesium-based composite material, in accordance with a second embodiment.

Referring to FIG. 5, the magnesium-based composite material 400 in the second embodiment is similar to the magnesium-based composite material 300 in the first embodiment, and includes five magnesium-based metallic layers 410, and two magnesium-based composite layers 420. The two magnesium-based composite layers 420 are respectively sandwiched by the five magnesium-based metallic layers 410.

It will be apparent to those having ordinary skill in the field of the present invention that the number of the magnesium-based metallic layers, and the magnesium-based composite layers is arbitrary or depended on actual needs/use. The magnesium-based composite layers are respectively sandwiched by the magnesium-based metallic layers. As the number of the magnesium-based composite layers increased, the strength and toughness of the magnesium-based composite material can be enhanced.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A magnesium-based composite material comprising:
    at least two magnesium-based metallic layers; and
    at least one magnesium-based composite layer sandwiched by the at least two magnesium-based metallic layers;
        wherein the at least one magnesium-based composite layer comprises nanoscale reinforcements and magnesium-based metallic material filled in interspaces between the nanoscale reinforcements.

2. The magnesium-based composite material as claimed in claim 1, wherein the material of the nanoscale reinforcements is selected from a group consisting of carbon nanotubes, carbon nanofibers, silicon carbide nano-particles, alumina nano-particles, titanium carbide nano-particles, and any combination thereof.

3. The magnesium-based composite material as claimed in claim 1, wherein a weight percentage of the nanoscale reinforcements in the magnesium-based composite material is in the approximate range from 0.5% to 2%.

4. The magnesium-based composite material as claimed in claim 1, wherein a diameter of the nanoscale reinforcements is in the approximate range from 1 nanometer to 100 nanometers.

5. The magnesium-based composite material as claimed in claim 1, wherein the magnesium-based metallic material is pure magnesium or magnesium alloy.

6. The magnesium-based composite material as claimed in claim 5, wherein the components of the magnesium alloy comprises magnesium and other elements selected from a group consisting of zinc, manganese, aluminum, thorium, lithium, silver, calcium, and any combination thereof.

7. The magnesium-based composite material as claimed in claim 6, wherein a weight ratio of the magnesium to the other elements is more than about 4:1.

8. A method for fabricating a magnesium-based composite material, the method comprising the steps of:
(a) providing at least two magnesium-based plates comprising magnesium-based material and a plurality of nanoscale reinforcements;
(c) sandwiching the nanoscale reinforcements between the at least two magnesium-based plates to form a preform; and
(d) hot pressing the preform to infiltrate the magnesium-based material into interspaces between the nanoscale reinforcements.

9. The method as claimed in claim 8, wherein step (c) further comprises substeps of:
(c1) forming a binder film on a surface of one of the two magnesium-based plates;
(c2) uniformly sprinkling the nanoscale reinforcements on the binder film; and
(c3) covering the nanoscale reinforcements by the other one of the magnesium-based plates to achieve the preform.

10. The method as claimed in claim 9, wherein the material of the binder film is adhesive at room temperature and volatilizable at high temperature.

11. The method as claimed in claim 10, wherein the binder film is a pressure sensitive adhesive.

12. The method as claimed in claim 8, wherein step (d) further comprises substeps of:
(d1) disposing the preform in a container and between two boards of a hot pressing machine;
(d2) evacuating the air in the container and filling a protective gas into the container;
(d3) applying a pressure on the preform through the two boards at a temperature for a period of time; and
(d4) relieving the pressure and cooling the preform to room temperature to achieve the magnesium-based composite material.

13. The method as claimed in claim 12, wherein the pressure is in the approximate range from 50 to 100 mega pascal, and the temperature is in the approximate range from 300° C. to 400° C.

14. The method as claimed in claim 12, further comprising an annealing step after step (d4) at an annealing temperature in an approximate range from about 180° C. to about 320° C. in vacuum or in a protective gas.

15. The method as claimed in claim 8, further comprising a step (f) of annealing the magnesium-based composite material.

16. A method for fabricating a magnesium-based composite material, the method comprising the steps of:
providing a magnesium-based plate and a plurality of nanoscale reinforcements;
dispersing the plurality of nanoscale reinforcements in a solvent;
spraying the solvent with the plurality of nanoscale reinforcements therein on a surface of the magnesium-based plate;
covering the plurality of nanoscale reinforcements sprayed on the surface of the magnesium-based plate by another magnesium-based plate to form a preform; and
hot pressing the preform.

17. The method as claimed in claim 16, wherein after the step of hot pressing, the preform is cooled to room temperature and then annealed at an annealing temperature in vacuum or in a protective gas.

18. The method as claimed in claim 17, wherein the annealing temperature is in an approximate range from about 180° C. to about 320° C.

* * * * *